United States Patent
Cho et al.

(10) Patent No.: US 10,782,974 B2
(45) Date of Patent: Sep. 22, 2020

(54) VLIW INTERFACE DEVICE AND METHOD FOR CONTROLLING THE SAME

(71) Applicant: SAMSUNG ELECTRONICS CO., LTD., Suwon-si (KR)

(72) Inventors: Young-chul Cho, Yongin-si (KR); Suk-jin Kim, Seoul (KR); Chul-soo Park, Suwon-si (KR); Dong-kwan Suh, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 134 days.

(21) Appl. No.: 15/360,271

(22) Filed: Nov. 23, 2016

(65) Prior Publication Data

US 2017/0147351 A1    May 25, 2017

(30) Foreign Application Priority Data

Nov. 25, 2015 (KR) .................. 10-2015-0165555

(51) Int. Cl.
*G06F 9/38* (2018.01)
*G06F 9/30* (2018.01)
*G06F 15/78* (2006.01)

(52) U.S. Cl.
CPC .......... *G06F 9/3802* (2013.01); *G06F 9/3001* (2013.01); *G06F 9/3016* (2013.01); *G06F 9/30043* (2013.01); *G06F 9/3824* (2013.01); *G06F 9/3853* (2013.01); *G06F 15/7839* (2013.01)

(58) Field of Classification Search
None
See application file for complete search history.

(56) References Cited

U.S. PATENT DOCUMENTS 7,437,540 B2    10/2008  Paolucci et al.
2012/0331268 A1*  12/2012  Konig ................. G06F 15/8007
                                                             712/11

FOREIGN PATENT DOCUMENTS

| JP | 2003-140910 A | 5/2003 |
| JP | 2014-81846 A | 5/2014 |
| KR | 10-2010-0111915 A | 10/2010 |
| KR | 10-2014-0070308 A | 6/2014 |

* cited by examiner

*Primary Examiner* — John M Lindlof
(74) *Attorney, Agent, or Firm* — Sughrue Mion, PLLC (57) ABSTRACT

A VLIW (Very Long Instruction Word) interface device includes a memory configured to store instructions and data, and a processor configured to process the instructions and the data, wherein the processor includes an instruction fetcher configured to output an instruction fetch request to load the instruction from the memory, a decoder configured to decode the instruction loaded on the instruction fetcher, an arithmetic logic unit (ALU) configured to perform an operation function if the decoded instruction is an operation instruction, a memory interface scheduler configured to schedule the instruction fetch request or a data fetch request that is input from the arithmetic logic unit, and a memory operator configured to perform a memory access operation in accordance with the scheduled instruction fetch request or data fetch request.

12 Claims, 7 Drawing Sheets

| Cycle | slot 0 | slot 1 | slot 2 |
|-------|--------|--------|--------|
| 0 | ld | ld | nop |
| 1 | ld | ld | nop |
| 2 | mul | ld | nop |
| 3 | ld | mul | or |
| 4 | add | sub | and |
| 5 | st | st | nop |
| 6 | st | st | nop |
| 7 | st | st | nop |

FIG. 5B

| Cycle | slot 0 | slot 1 | slot 2 |
|-------|--------|--------|--------|
| 0 | ld | ld | ld |
| 1 | ld | ld | ld |
| 2 | mul | mul | or |
| 3 | add | sub | and |
| 4 | st | st | st |
| 5 | st | st | st |
| 6 | | | |
| 7 | | | |

| Application | Related Art | Present Disclosure | Performance Improvement |
|---|---|---|---|
| Voice trigger | 100% | 104.2% | 4.2% |
| Mp3 | 100% | 106.1% | 6.1% |
| Picture quality enhancement (local dimming) | 100% | 112.0% | 12% |

VLIW INTERFACE DEVICE AND METHOD FOR CONTROLLING THE SAME

CROSS-REFERENCE TO RELATED APPLICATION(S)

This application claims priority from Korean Patent Application No. 10-2015-0165555 filed on Nov. 25, 2015 in the Korean Intellectual Property Office, the disclosure of which is incorporated herein by reference in its entirety.

BACKGROUND

Field

Apparatuses and methods consistent with exemplary embodiments relate to a VLIW interface device and a method for controlling the same, and more particularly, to a VLIW interface device and a method for controlling the same, which can process VLIW instructions.

Description of the Related Art

VLIW (Very Long Instruction Word) refers to an instruction that has a long length. That is, a VLIW processor has a structure that can perform many instructions in the same cycle as compared with a general RISC processor. For example, the VLIW processor can simultaneously perform a plurality of instructions.

Figure 1:
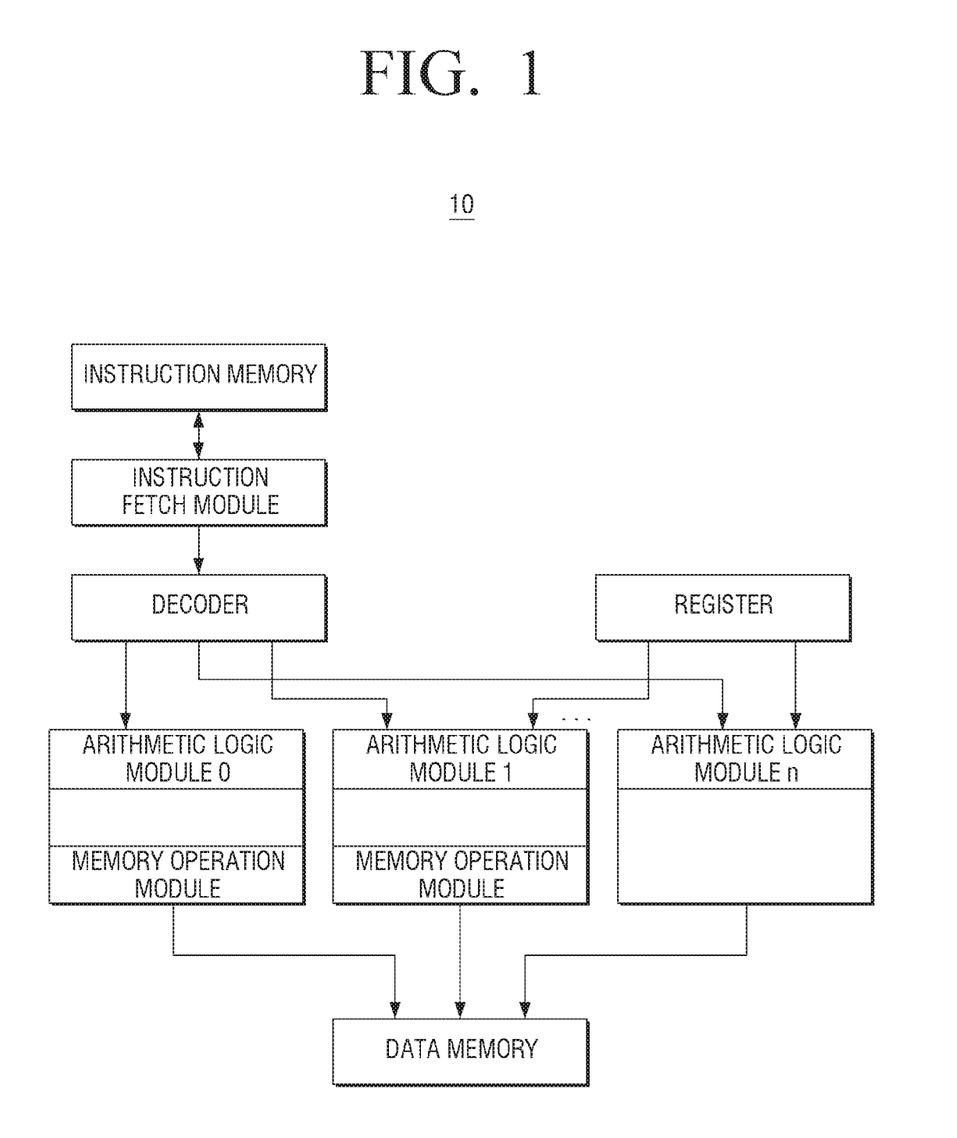
FIG. 1 is a block diagram of a related art VLIW interface device.

FIG. 1 is a block diagram of a related art VLIW interface device.

The related art VLIW interface device 10 includes an instruction memory and a data memory, which are separated from each other. The instruction memory stores instructions, and transmits the instructions to an instruction patch module in accordance with an instruction fetch request from the instruction fetch module. The data memory stores operation-related data. Accordingly, the related art VLIW interface device 10 may use a plurality of memories. The related art VLIW interface device 10 may include a plurality of arithmetic logic units (ALU) and memory operation modules (e.g., memory operators). However, because the memory operation modules are expensive and the number of memory operations is smaller than the number of arithmetic logic units, the VLIW interface device includes fewer memory operation modules than arithmetic logic units. In the related art VLIW interface device 10, the arithmetic logic unit may include the memory operation module. However, because the number of memory operation modules is smaller than the number of arithmetic logic units, there may be arithmetic logic units that do not include the memory operation modules. Because the related art VLIW interface device 10 has the above-described configuration, it has the interface may be unable to be shared in the case in which the data memory is not in use and the operation processing speed is lowered in the case in which many memory operations may be simultaneously required.

SUMMARY

Exemplary embodiments provide a VLIW interface device and a method for controlling the same, which may improve the performance by improving efficiency of a memory interface.

According to an aspect of an exemplary embodiment, there is provided a VLIW (Very Long Instruction Word) interface device including: a memory configured to store an instruction and data; and a processor configured to process the instruction and the data, wherein the processor includes: an instruction fetcher configured to output an instruction fetch request to load the instruction from the memory; a decoder configured to decode the instruction loaded on the instruction fetcher; an arithmetic logic unit (ALU) configured to, in response to the decoded instruction being an operation instruction, perform an operation function; a memory interface scheduler configured to schedule the instruction fetch request or a data fetch request that is input from the ALU; and a memory operator configured to perform a memory access operation in accordance with the scheduled instruction fetch request or the data fetch request.

The instruction fetcher may share an interface of the memory operator.

The memory interface scheduler may be further configured to connect the instruction fetcher and the memory operator to each other in accordance with the instruction fetch request, and connect the ALU and the memory operator to each other in accordance with the data fetch request.

The processor may include a plurality of memory operators, and the memory interface scheduler may be configured to determine the number of requests that are pre-allocated to the plurality of memory operators, and allocate the instruction fetch request or the data fetch request to the memory operator that has a smallest number of the pre-allocated requests.

The processor may include a plurality of instruction fetchers, and the instruction fetchers may be configured to output a plurality of instruction fetch requests to the memory interface scheduler for one cycle.

The memory interface scheduler may be configured to allocate the plurality of instruction fetch requests to the plurality of memory operators.

The plurality of memory operators may be configured to simultaneously load a plurality of instructions from the memory for one cycle.

The processor may include a plurality of ALUs, and the memory interface scheduler may be configured to allocate at least one of the data fetch requests to the plurality of memory operators in accordance with predetermined priorities.

According to an aspect of another exemplary embodiment, there is provided a method for controlling a VLIW (Very Long Instruction Word) interface device, including: outputting an instruction fetch request to load an instruction from a memory that stores the instruction and data; a decoder decoding the instruction loaded in accordance with the instruction fetch request; in response to the decoded instruction being an operation instruction, performing an operation function; scheduling the instruction fetch request or a data fetch request that is input from the ALU; and performing a memory access operation in accordance with the scheduled instruction fetch request or data fetch request.

The scheduling may further include sharing an interface of a memory operator.

The scheduling may further include connecting an instruction fetcher and the memory operator to each other in accordance with the instruction fetch request, and connecting the ALU and the memory operator to each other in accordance with the data fetch request.

The scheduling may further include determining the number of requests that are pre-allocated to a plurality of memory operators, and allocating the instruction fetch request or the data fetch request to the memory operator that has a smallest number of the pre-allocated requests.

The outputting the instruction fetch request may further include outputting a plurality of instruction fetch requests from a plurality of instruction fetchers to the memory interface scheduler for one cycle.

The scheduling may further include allocating the plurality of instruction fetch requests to the plurality of memory operators.

The performing the memory access operation may further include simultaneously loading a plurality of instructions from the memory for one cycle.

The scheduling may further include allocating at least one of data fetch requests from a plurality of ALUs to the plurality of memory operators in accordance with predetermined priorities.

According to an aspect of another exemplary embodiment, there is provided a device including: a memory configured to store an instruction and data; and a processor configured to process the instruction and the data, wherein the processor includes: an arithmetic logic unit (ALU) configured to, in response to the instruction being an operation instruction, perform an operation function; a memory interface scheduler configured to schedule an instruction fetch request or a data fetch request that is input from the ALU; and a memory operator configured to perform a memory access operation in accordance with the scheduled instruction fetch request or the data fetch request.

The memory access operation may include at least one from among loading and storing for accessing the memory.

The device may include a plurality of memory operators, and the memory interface scheduler may be further configured to determine a number of memory access operations that are allocated to the memory operators and allocate the data fetch request to the memory with a smallest number of memory operations allocated thereto.

The instruction and the data may be stored in a same memory.

As described above, according to one or more exemplary embodiments, if the memory and the processor can be efficiently used, the performance of the processor can be improved.

Additional and/or other aspects will be set forth in part in the description which follows and, in part, will be obvious from the description, or may be learned by practice of exemplary embodiments.

BRIEF DESCRIPTION OF THE DRAWINGS

The above and/or other aspects will be more apparent by describing exemplary embodiments with reference to the accompanying drawings, in which.

DETAILED DESCRIPTION OF EXEMPLARY EMBODIMENTS

Below, exemplary embodiments will be described in detail with reference to the accompanying drawings. Exemplary embodiments described below may be variously modified. Exemplary embodiments are not limited to the exemplary embodiments disclosed in the accompanying drawings, and it should be understood that the present disclosure includes any equivalents and substitutions that are included in the idea and the technical range of the present disclosure. In the present disclosure, well-known element structures and technologies may not be described in detail if they would obscure the present disclosure with unnecessary detail.

Although terms including ordinal numbers "first," "second," etc., may be used to describe diverse elements, such elements are not limited by the terms. The terms are used to discern one element from other elements. The terms are not used to indicate an order or an importance.

The terms "includes" or "has" used in the present disclosure represents that features, figures, steps, operations, constituent elements, components, or combinations thereof exist. However, the terms should be understood to mean that the existence or addition of one or more other features, figures, steps, operations, constituent elements, components, or combinations thereof are not excluded. The term "connected to" or "coupled to" is used to designate a connection or coupling of one element to another element and includes both a case that an element is "directly connected" or "coupled to" another element and a case that an element is connected or coupled to another element via still another element. The term "directly connected to" or "directly coupled to" refers to an element being connected or coupled to another element without an intervening element.

According to one or more exemplary embodiments, the term "module" or "portion", as used herein, may refer to, but is not limited to, a software or hardware component or a combination thereof, which performs tasks. Further, "a plurality of modules or portions" may be integrally formed as at least one module and may be implemented by at least one processor.

A singular form may include a plural form as long as it is not specifically indicated otherwise.

Figure 2:
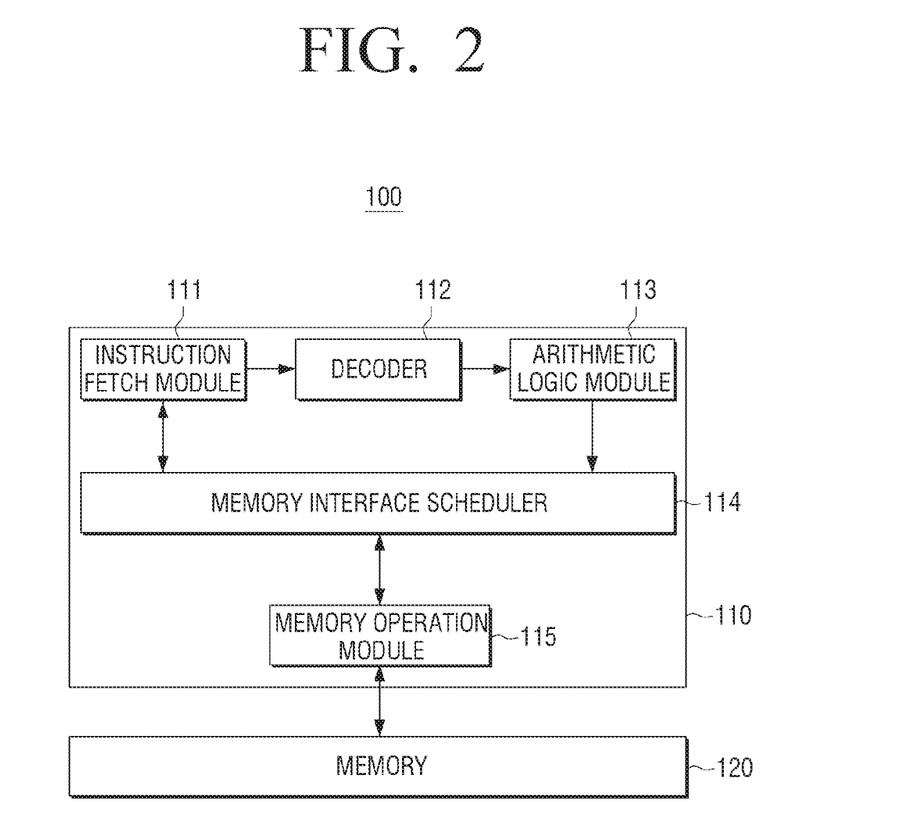
FIG. 2 is a block diagram of a VLIW interface device according to an exemplary embodiment.

FIG. 2 is a block diagram of a VLIW interface device according to an exemplary embodiment.

Referring to FIG. 2, a VLIW interface device 100 includes a processor 110 and a memory 120. The memory 120 stores instructions and data. The processor 110 processes the instructions and the data. The memory 120 may store both the instructions and the data. The memory 120 may include at least one type of storage medium selected from the group including flash memory type, hard disk type, SSD (Solid State Disk) type, SDD (Silicon Disk Drive) type, multimedia card micro type, card type memory (e.g., SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), cache memory, register, magnetic memory, magnetic disk, and optical disk, etc.

The processor 110 may read/write the instruction or data from/to the memory 120.

The processor 110 includes an instruction fetch module 111 (e.g., instruction fetcher), a decoder 112, an arithmetic logic module 113 (e.g., arithmetic logic unit (ALU)), a memory interface scheduler 114, and a memory operation module 115 (e.g., memory operator). The instruction fetch module 111 outputs an instruction fetch request to load the instruction from the memory 120. The output instruction fetch request is allocated to the memory operation module 115 by the memory interface scheduler 114. The memory operation module 115 may read the instruction from the memory 120. The read instruction is transferred to the instruction fetch module 111 through the memory interface scheduler 114. The instruction fetch module 111 transfers the read instruction to the decoder 112.

The decoder 112 decodes the transferred instruction. If the decoded instruction is an arithmetic or logic operation instruction, the decoder 112 transfers the decoded instruction to the arithmetic logic unit 113. The arithmetic logic unit (ALU) 113 performs an arithmetic operation or logic operation in accordance with the transferred arithmetic or logic operation instruction. The arithmetic logic unit 113 transfers a data fetch request to the memory interface scheduler 114 to load operation result data or data to be used for the operation.

The memory interface scheduler 114 schedules the data fetch request. A plurality of memory operation modules 115 may exist, and the memory interface scheduler 114 determines the numbers of memory access operations (or memory operations) that are allocated to the respective memory operation modules 115 and allocates the data fetch request to the memory operation module 115 that has the smallest number of memory operations allocated thereto. The memory operation refers to an operation, such as loading or storing for accessing the memory. That is, the memory operation is discriminated from the arithmetic operation or logic operation that is performed by the arithmetic logic unit 113.

If the numbers of the memory operations allocated to the memory operation module 115 are equal to each other, the memory interface scheduler 114 allocates the data fetch request to a memory operation module 115. The memory interface scheduler 114 allocates the data fetch request to the memory operation module 115 in a predetermined order. According to another exemplary embodiment, both the instruction and the data may be stored in the same memory. Accordingly, the memory interface scheduler 114 may also schedule the instruction fetch request that is transferred from the instruction fetch module 111 in the same manner.

The memory operation module 115 performs memory operation in accordance with the scheduled instruction fetch request or data fetch request. That is, the memory operation module 115 may load the instruction or the data from the memory or may store the data in the memory.

Figure 3:
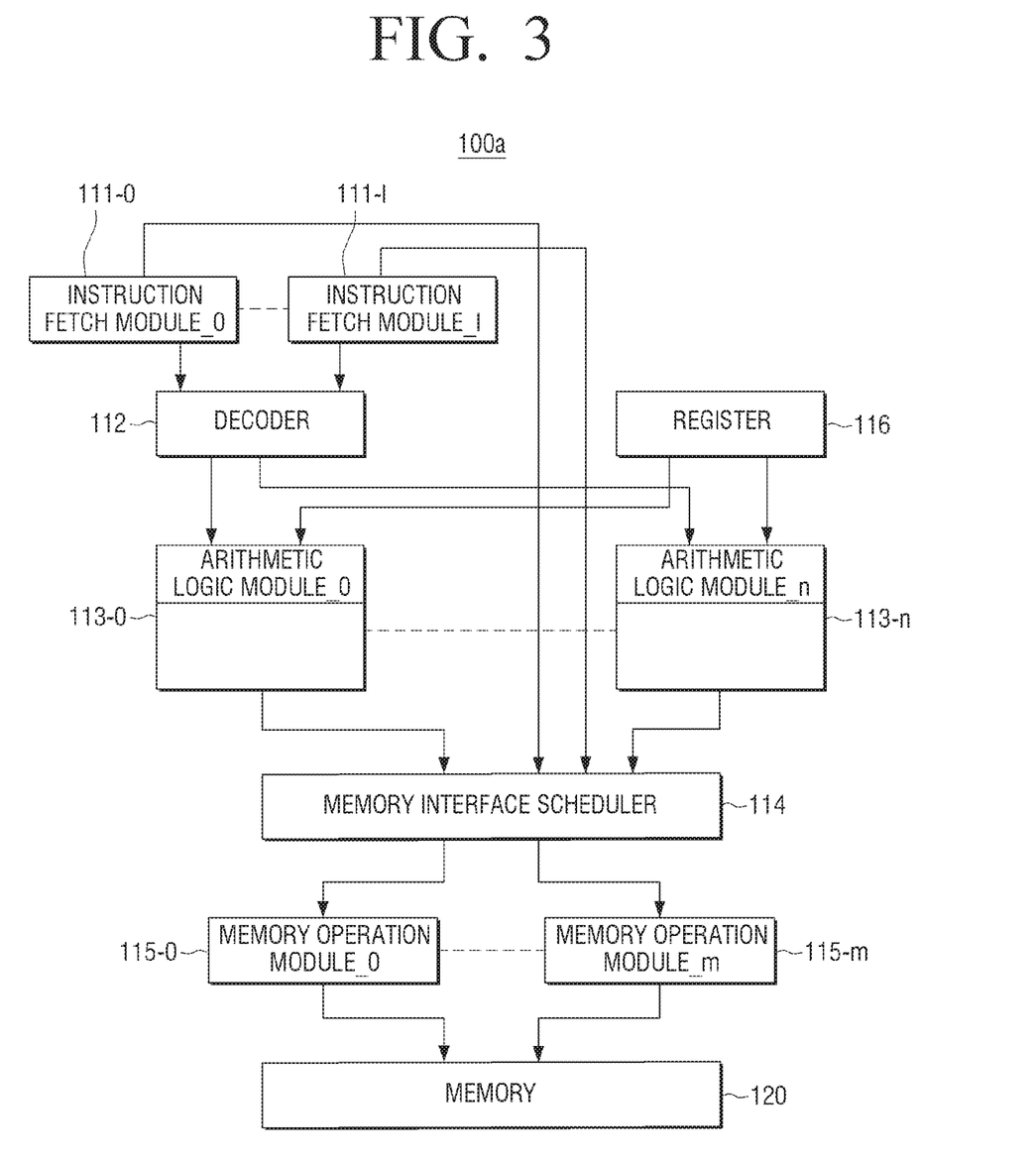
FIG. 3 is a block diagram of a VLIW interface device according to an exemplary embodiment.

FIG. 3 is a block diagram of a VLIW interface device according to an exemplary embodiment.

Referring to FIG. 3, a VLIW interface device 100*a* includes a plurality of instruction fetch modules 111-0 and 111-1, a decoder 112, a plurality of arithmetic logic units 113-0 to 113-*n*, a memory interface scheduler 114, a plurality of memory operation modules 115-0 to 115-*m*, a register 116, and a memory 120. The memory 120 may store instructions or data.

The plurality of instruction fetch modules 111-0 and 111-1 may output instruction fetch requests. The related art VLIW interface device includes one instruction fetch module. However, the VLIW interface device 100*a* according to an exemplary embodiment includes the plurality of instruction fetch modules 111-0 and 111-1, and thus can simultaneously output a plurality of instruction fetch requests. Further, the VLIW interface device 100*a* according to an exemplary embodiment can load a plurality of instructions. For example, the related art VLIW interface device can load one instruction, and thus, in the case of a conditional instruction, it can load one instruction through prediction. If the prediction is false, the related art VLIW interface device may interrupt processing of the instruction being executed and then may load a new instruction, deteriorating the efficiency. However, the VLIW interface device 100*a*, according to an exemplary embodiment, can load a plurality of instructions. Thus, in the case of the conditional instruction, it can load the plurality of instructions. Accordingly, the VLIW interface device 100*a* can load all instructions of which the conditional instructions can be branched, and thus, may process the instructions without delay.

The decoder 112 decodes the instructions loaded on the instruction fetch modules. If the decoded instructions are arithmetic or logic operation instructions, the arithmetic logic units 113-0 to 113-*n* may perform the arithmetic or logic operations. The VLIW interface device 100*a* may include a plurality of arithmetic logic units 113-0 to 113-*n*.

The memory interface scheduler 114 may schedule the instruction fetch requests or data fetch requests that are input from the arithmetic logic units 113-0 to 113-*n*. The related art VLIW interface device may separately manage the instruction memory and the data memory.

The related art VLIW interface device may include the memory operation module for loading the instruction. That is, the related art VLIW interface device may load the instruction from the memory to the instruction memory operation module in accordance with the instruction fetch request, and may transfer the loaded instruction to the instruction fetch module. Further, the related art VLIW interface device may load the data from the data memory to the memory operation module in accordance with the data fetch request, and may transfer the loaded data to the arithmetic logic unit. Because the number of memory operations is smaller than the number of arithmetic or logic operations, and the memory operation modules are expensive, the number of memory operation modules is smaller than the number of arithmetic logic units. For example, the related art VLIW interface device may include one instruction memory operation module, n arithmetic logic units, and m data memory operation modules. In this case, n is larger than m. Accordingly, the related art VLIW interface device includes (m+1) memory operation modules, one instruction memory interface, and m data memory interfaces. The related art VLIW interface device may maximally load one instruction for one cycle. Further, the related art VLIW interface device may maximally load or store m pieces of data for one cycle.

The VLIW interface device 100*a*, according to an exemplary embodiment, may manage the instructions and the data in one memory, and may share the instruction memory interface and the data memory interface. The memory interface scheduler 114 may take charge of scheduling the instruction memory interface and the data memory interface. According to an exemplary embodiment, the VLIW interface device 100*a* includes (m+1) memory operation modules in the same manner as the related art VLIW interface device. Because the VLIW interface device 100*a*, according to an exemplary embodiment, can share the instruction memory interface and the data memory interface, it can load (m+1) instructions. The VLIW interface device 100*a* may load or store (m+1) pieces of data. Accordingly, the VLIW interface device 100*a* can perform more efficient instruction processes with the same number of memory operation modules as the related art VLIW interface device. That is, the VLIW interface device 100*a* may improve the instruction processing performance through the same hardware cost.

The VLIW interface device 100*a* may include a plurality of memory operation modules 115-0 to 115-*m*. The plurality of memory operation modules 115-0 to 115-*m* may perform memory access operations (or memory operations) in accordance with the instruction fetch requests or data fetch requests. For example, the memory operation may include loading or storing operation. The VLIW interface device 100a may include the register 116. The register 116 may temporarily store data that is frequently used when the arithmetic logic units 113-0 to 113-n perform operations. The arithmetic logic units 113-0 to 113-n may load data from the register 116.

Figure 4:
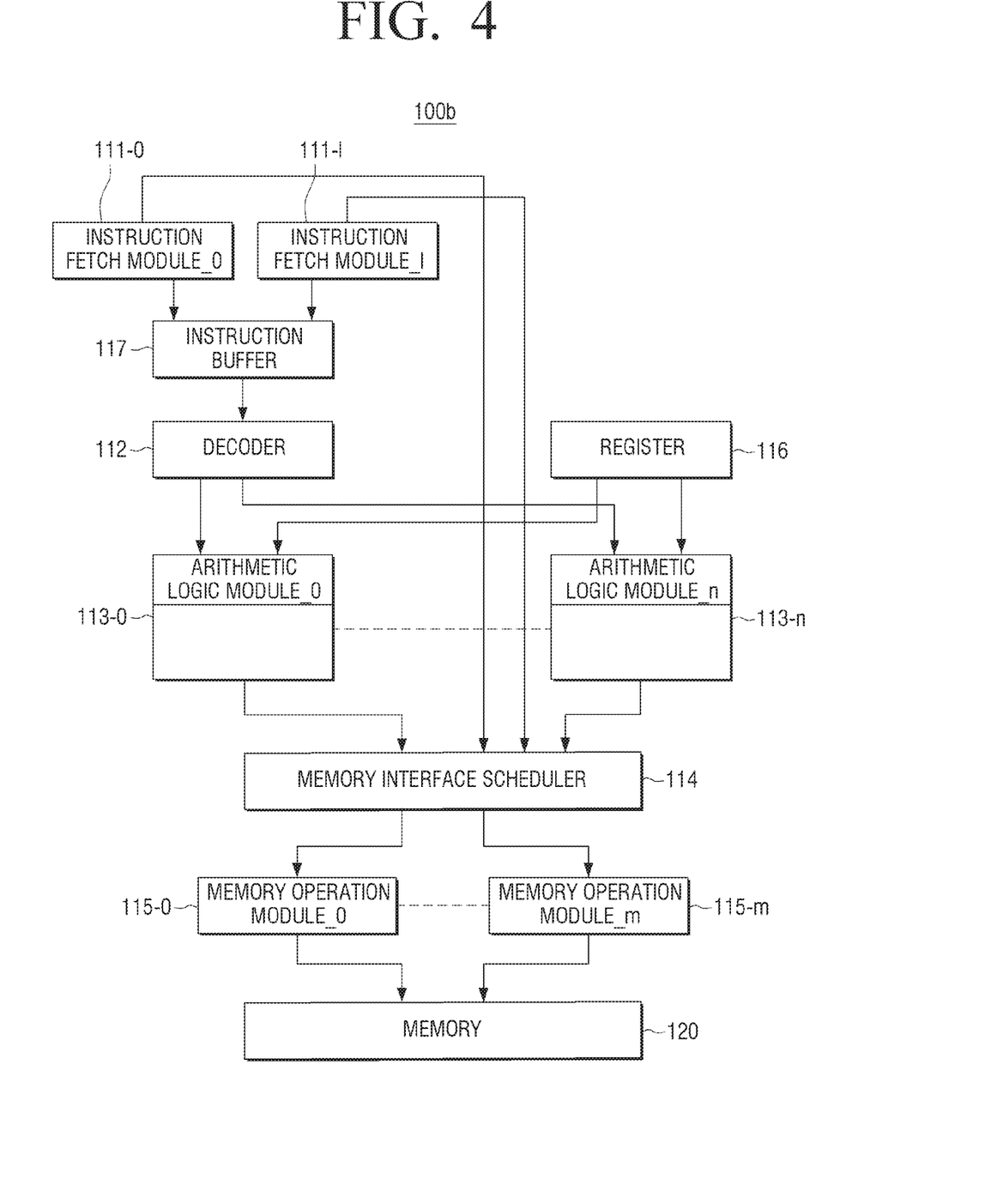
FIG. 4 is a block diagram of a VLIW interface device according to an exemplary embodiment.

FIG. 4 is a block diagram of a VLIW interface device according to an exemplary embodiment.

Referring to FIG. 4, a VLIW interface device 100b includes a plurality of instruction fetch modules 111-0 and 111-1, a decoder 112, a plurality of arithmetic logic units 113-0 to 113-n, a memory interface scheduler 114, a plurality of memory operation modules 115-0 to 115-m, a register 116, an instruction buffer 117, and a memory 120. The VLIW interface device 100b has a similar configuration to the configuration of the VLIW interface device 100a as described above with reference to FIG. 3.

The VLIW interface device 100b, as illustrated in FIG. 4, may further include the instruction buffer 117. The instruction buffer 117 may be located between the instruction fetch modules 111-0 and 110-1 and the decoder 112 to store pre-read instructions.

Figure 5A:
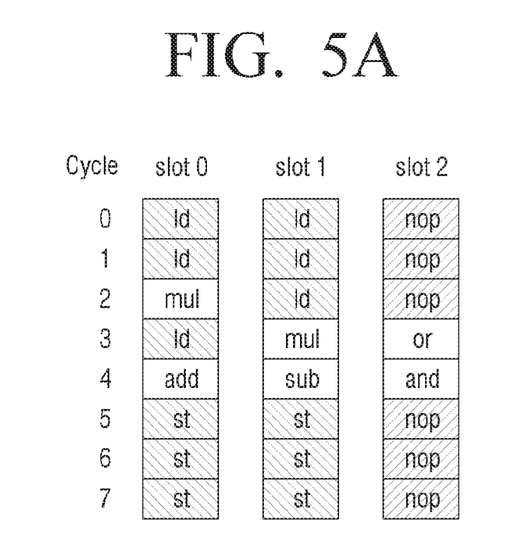
FIGS. 5A and 5B are diagrams illustrating instruction execution processes in the related art VLIW interface device and the VLIW interface device according to an exemplary embodiment.
Figure 5B:
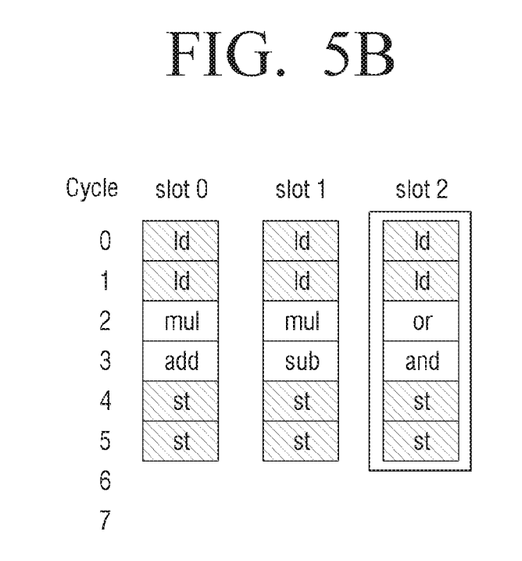

FIGS. 5A and 5B are diagrams illustrating instruction execution processes in the related art VLIW interface device and the VLIW interface device according to an exemplary embodiment FIG. 5A illustrates instructions executed in the related art VLIW interface device. The related art VLIW interface device may perform a plurality of memory operations 'ld' and 'st,' a plurality of arithmetic operations 'mul,' 'add,' and 'sub' and logic operations 'o'r and 'and.' As described above, in the related art VLIW interface device, the number of memory operation modules may be smaller than the number of arithmetic logic units. For example, in the related art VLIW interface device, the memory operation module may be included only in slot 0 and slot 1. Accordingly, the memory operation may be performed only in slot 0 and slot 1. In the related art VLIW interface device, partial arithmetic operation and logic operation may be performed after the memory operation is performed. As shown in FIG. 5A, the related art VLIW interface device may use a time of 7 cycles to perform all operations due to a bottleneck phenomenon of the memory operations.

FIG. 5B illustrates executing instructions in the VLIW interface device according to an exemplary embodiment. In the same manner as the related art VLIW interface device, the VLIW interface device, according to an exemplary embodiment, may also include three operation slots. Further, the VLIW interface device, according to an exemplary embodiment, may perform the same instruction set as illustrated in FIG. 5A.

However, as described above, the VLIW interface device, according to an exemplary embodiment, may share the instruction and data memories and the memory operation modules, and may be scheduled by the memory interface scheduler. Accordingly, the VLIW interface device, according to an exemplary embodiment, can perform the memory operation in all three slots. As a result, the VLIW interface device, according to an exemplary embodiment, may use a time of 5 cycles to perform the same instruction set as the instruction set that is performed by the related art VLIW interface device. Accordingly, the VLIW interface device, according to an exemplary embodiment, can efficiently process the instructions.

In addition, unlike the related art VLIW interface device, the VLIW interface device, according to an exemplary embodiment, can load a plurality of instructions even in the case in which a control flow is branched. Further, in the VLIW interface device, according to an exemplary embodiment, unlike in the related art VLIW interface device, overhead of the cycle does not occur even in the case in which the prediction of the control flow becomes false.

Above, one or more exemplary embodiments of the VLIW interface device have been described. Below, a method for controlling the VLIW interface device will be described.

Figure 6:
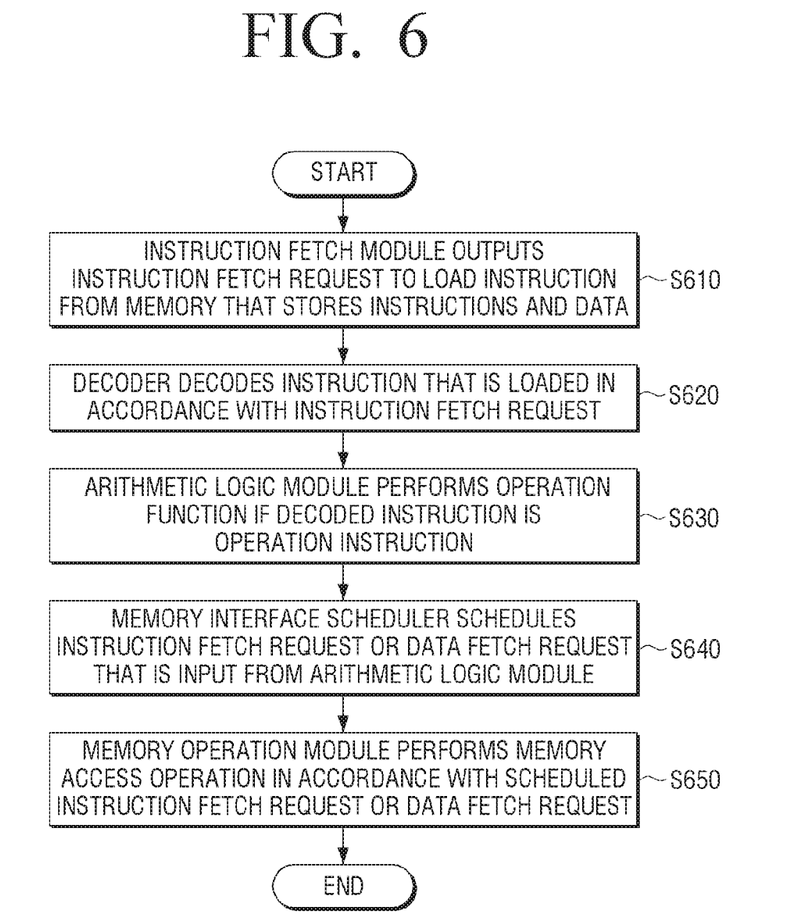
FIG. 6 is a flowchart of a method for controlling a VLIW interface device according to an exemplary embodiment.

FIG. 6 is a flowchart of a method for controlling a VLIW interface device according to an exemplary embodiment.

Referring to FIG. 6, the VLIW interface device outputs an instruction fetch request to load an instruction from a memory that stores the instruction and data (S610). The VLIW interface device may include a plurality of instruction fetch modules and may output a plurality of instruction fetch instructions to a memory interface scheduler for one cycle.

The VLIW interface device decodes the instruction loaded in accordance with the instruction fetch request (S620). If the decoded instruction is an arithmetic or logic operation instruction, the VLIW interface device performs arithmetic or logic operation (S630).

The VLIW interface device schedules the instruction fetch request or a data fetch request that is input from an arithmetic logic unit (S640). The VLIW interface device may share an interface of a memory operation module. That is, the VLIW interface device may share an instruction memory interface and a data memory interface. The VLIW interface device may connect the instruction fetch module and the memory operation module to each other in accordance with the instruction fetch request, and may connect the arithmetic logic unit and the memory operation module to each other in accordance with the data fetch request. Further, the VLIW interface device may include a plurality of memory operation modules and may allocate the instruction fetch request or the data fetch request to the memory operation module that has the smallest number of pre-allocated requests.

The VLIW interface device performs the memory access operation in accordance with the scheduled instruction fetch request or data fetch request (S650). The VLIW interface device may simultaneously load a plurality of instructions or data from the memory for one cycle.

Figure 7:
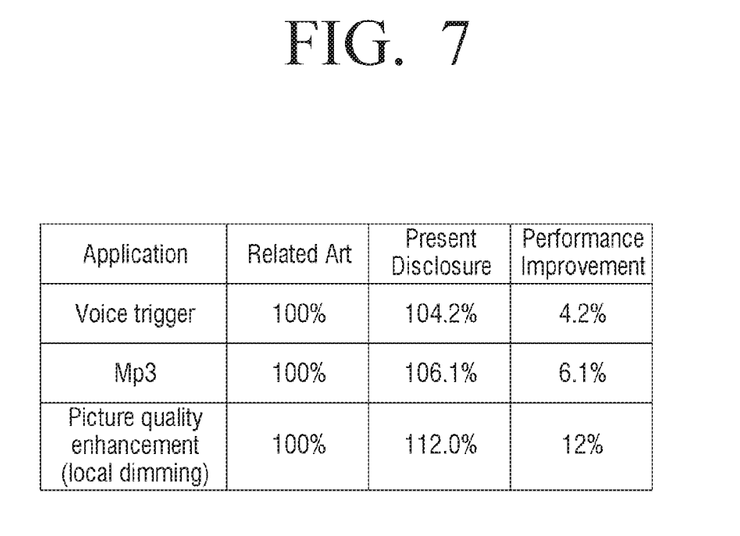
FIG. 7 is a diagram illustrating experimental results according to an exemplary embodiment.

FIG. 7 is a diagram illustrating experimental results according to an exemplary embodiment.

Referring to FIG. 7, processing performances of functions between the VLIW interface device and the related art VLIW interface device are comparatively illustrated. For example, in the case of a voice trigger function, the performance of the VLIW interface device according to an exemplary embodiment is improved by about 4.2%. In the case of an MP3 function, the performance of the VLIW interface device according to an exemplary embodiment is improved by about 6.1%, and in the case of an image quality improvement function, the performance of the VLIW interface device according to an exemplary embodiment is improved by about 12%. In the case of performing a function having many memory operation instructions, the performance of the VLIW interface device according to an exemplary embodiment can be improved in comparison to the performance of the related art VLIW interface device.

The method for controlling the VLIW interface device according to one or more exemplary embodiments described above may be implemented by a program to be provided to the VLIW interface device.

For example, a non-transitory computer readable medium, which stores a program that performs outputting an instruction fetch request to load an instruction from a memory that stores the instruction and data, decoding the instruction loaded in accordance with the instruction fetch request, performing an operation function if the decoded instruction is an operation instruction, scheduling the instruction fetch request or a data fetch request that is input from the arithmetic logic unit, and performing a memory access operation in accordance with the scheduled instruction fetch request or data fetch request, may be provided.

The non-transitory computer readable medium may be a medium which semi-permanently stores data and is readable by a device. Specifically, the above-described programs may be stored and provided in the non-transitory computer readable medium, such as, a CD, a DVD, a hard disc, a Blu-ray disc, a USB, a memory card, and a ROM.

Although one or more exemplary embodiments have been individually described, the configurations and operations of exemplary respective embodiments may be implemented in combination with other exemplary embodiments. The above exemplary embodiments are merely exemplary and are not to be construed as limiting. The exemplary embodiments can be readily applied to other types of devices. The description of exemplary embodiments is intended to be illustrative, and not to limit the scope of the claims, and many alternatives, modifications, and variations will be apparent to those skilled in the art.

What is claimed is:

1. A VLIW (Very Long Instruction Word) interface device comprising:
    a memory storing an instruction and data; and
    a processor configured to process the instruction and the data,
    wherein the processor comprises:
        an instruction fetcher configured to output an instruction fetch request to load the instruction from the memory;
        a decoder configured to decode the instruction loaded on the instruction fetcher;
        an arithmetic logic unit (ALU) configured to, based on the decoded instruction being an operation instruction, perform an operation function and output a data fetch request to load the data related to the operation function from the memory;
    a plurality of memory modules;
        a memory interface scheduler configured to schedule the instruction fetch request or the data fetch request that is input from the ALU by allocating the instruction fetch request or the data fetch request selectively to each of the plurality of memory modules; and
        wherein each of the plurality of memory modules is configured to perform a memory access operation to access the instruction stored in the memory according to the scheduled instruction fetch request, or the data stored in the memory according to the scheduled data fetch request,
    wherein the data is at least one of operation result data of the decoded instruction or data used for operation of the decoded instruction, and
    wherein the instruction fetcher shares an interface of the memory module, and
    wherein the memory interface scheduler is further configured to:
        allocate the instruction fetch request or the data fetch request to a memory module to which a smallest number of requests are allocated from among the plurality of memory modules,
        connect the instruction fetcher and the memory module to each other in accordance with the instruction fetch request to load the instruction stored in the memory onto the memory module, and
        connect the ALU and the memory module to each other in accordance with the data fetch request to load the data stored in the memory onto the memory module.

2. The VLIW interface device as claimed in claim 1, wherein the processor comprises a plurality of instruction fetchers, and
    the instruction fetchers are configured to output a plurality of instruction fetch requests to the memory interface scheduler for one cycle.

3. The VLIW interface device as claimed in claim 2, wherein the memory interface scheduler is configured to allocate the plurality of instruction fetch requests to the plurality of memory modules.

4. The VLIW interface device as claimed in claim 3, wherein the plurality of memory modules are configured to simultaneously load a plurality of instructions from the memory for one cycle.

5. The VLIW interface device as claimed in claim 1, wherein the processor comprises a plurality of ALUs, and
    the memory interface scheduler is configured to allocate at least one of the data fetch requests to the plurality of memory modules in accordance with predetermined priorities.

6. A method for controlling a VLIW (Very Long Instruction Word) interface device, comprising:
    outputting an instruction fetch request to load an instruction from a memory that stores the instruction and data;
    decoding the instruction loaded in accordance with the instruction fetch request;
    in response to the decoded instruction being an operation instruction, performing an operation function and outputting a data fetch request to load the data related to the operation function;
    scheduling the instruction fetch request or the data fetch request that is input from an arithmetic logic unit (ALU) by allocating the instruction fetch request or the data fetch request selectively to each of a plurality of memory modules; and
    performing, by each of the plurality of memory modules, a memory access operation to access the instruction stored in the memory according to the scheduled instruction fetch request, or the data stored in the memory according to the scheduled data fetch request,
    wherein the data is at least one of operation result data of the decoded instruction or data used for operation of the decoded instruction,
    wherein the scheduling further comprises sharing an interface of a memory module, and
    wherein the scheduling further comprises allocating the instruction fetch request or the data fetch request to a memory module to which a smallest number of requests are allocated from among the plurality of memory modules, connecting an instruction fetcher and the memory module to each other in accordance with the instruction fetch request to load the instruction stored in the memory onto the memory module, and connecting the ALU and the memory module to each other in accordance with the data fetch request to load the data stored in the memory onto the memory module.

7. The method as claimed in claim 6, wherein the outputting the instruction fetch request further comprises outputting a plurality of instruction fetch requests from a plurality of instruction fetchers to a memory interface scheduler for one cycle.

8. The method as claimed in claim 7, wherein the scheduling further comprises allocating the plurality of instruction fetch requests to the plurality of memory modules.

9. The method as claimed in claim 8, wherein the performing the memory access operation further comprises simultaneously loading a plurality of instructions from the memory for one cycle.

10. The method as claimed in claim 6, wherein the scheduling further comprises allocating at least one of data fetch requests from a plurality of ALUs to the plurality of memory modules in accordance with predetermined priorities.

11. A device comprising:
 a memory configured to store an instruction and data; and
 a processor configured to process the instruction and the data,
 wherein the processor comprises:
 an arithmetic logic unit (ALU) configured to, in response to the instruction being an operation instruction, perform an operation function and output a data fetch request to load the data related to the operation function from the memory;
 a plurality of memory modules;
 a memory interface scheduler configured to schedule an instruction fetch request or the data fetch request that is input from the ALU by allocating the instruction fetch request or the data fetch request selectively to each of the plurality of memory modules; and
 wherein each of the plurality of memory modules configured to perform a memory access operation to access the instruction stored in the memory according to the scheduled instruction fetch request, and the data stored in the memory according to the scheduled data fetch request,
 wherein the memory interface scheduler is further configured to:
 allocate the instruction fetch request or the data fetch request to a memory module to which a smallest number of requests are allocated from among the plurality of memory modules,
 wherein the data is at least one of operation result data of a decoded instruction or data used for operation of the decoded instruction, and
 wherein the instruction and the data are stored in a same memory.

12. The device of claim 11, wherein the memory access operation comprises at least one from among loading and storing for accessing the memory.

* * * * *